United States Patent

Guntzburger

[11] Patent Number: 5,982,442
[45] Date of Patent: Nov. 9, 1999

[54] METHOD AND FILTER FOR REDUCING THE BLOCKING EFFECT IN IMAGE TRANSMISSION AND STORAGE

[75] Inventor: Philippe Guntzburger, Dachstein, France

[73] Assignee: Alcatel Alsthom Compagnie Generale d'Electricite, Paris, France

[21] Appl. No.: 08/980,240

[22] Filed: Nov. 28, 1997

[30] Foreign Application Priority Data

Nov. 28, 1996 [EP] European Pat. Off. .............. 96440100

[51] Int. Cl.$^6$ ....................................... H04N 7/12
[52] U.S. Cl. ........................................... 348/420; 382/268
[58] Field of Search .................................. 348/420, 607, 348/398, 422, 404, 400, 401, 402, 409, 416, 421, 403; 382/232, 266, 268, 275, 267; 358/433; H04N 7/12

[56] References Cited

U.S. PATENT DOCUMENTS

| | | | |
|---|---|---|---|
| 4,941,043 | 7/1990 | Jass ........................................ | 348/404 |
| 5,229,864 | 7/1993 | Moronaga et al. ..................... | 358/433 |
| 5,475,434 | 12/1995 | Kim ....................................... | 348/420 |
| 5,563,662 | 10/1996 | Kishi ...................................... | 348/420 |
| 5,610,729 | 3/1997 | Nakajima .............................. | 348/607 |
| 5,675,666 | 10/1997 | Komuro et al. ....................... | 348/420 |

FOREIGN PATENT DOCUMENTS

| | | |
|---|---|---|
| 0526885 | 2/1993 | European Pat. Off. . |
| 2287153 | 2/1995 | United Kingdom . |

OTHER PUBLICATIONS

"Post–Filtering Methods for Reducing Blocking Effects from Coded Images", T. Jarske et al, *IEEE Transactions on Consumer Electronics* vol. 40, (1994) No. 3, New York pp. 521–526.

"Linear Filtering for Reducing Blocking Effects in Orthogonal Transform Image Coding", C. Avril et al, *Journal of Electronic Imaging*, vol. 1(2), Apr. 1992, pp. 183–191.

"Reduction of Blocking Effects in Image Coding", H. Reeve III et al, *Optical Engineering*, Jan.–Feb. 1984, vol. 23, No. 1, pp. 34–37.

"Post–Filtering of Transform–Coded Images", K Tzou, *SPIE Applications of Digital Image Processing XI*, vol. 974 (1988), pp., 121–126.

"One Dimensional Processing for Adaptive Image Restoration", Chan et al., IEEE International Conference on Acoustics, Speech and Signal Processing, San Diego Mar. 19–21, 1984, pp. 37.3.1–37.3.4.

*Primary Examiner*—Tommy P. Chin
*Assistant Examiner*—Gims Philippe
*Attorney, Agent, or Firm*—Ware, Fressola, Van Der Sluys & Adolphson LLP

[57] ABSTRACT

For image transmission, image data is compressed block by block, and the compressed data is transmitted and decompressed. Due to an information loss during transmission, discontinuities are visible in pictures thus restored, particularly at block boundaries ("blocking effect"). The higher the bit rate, the more visible the discontinuities will be. This is improved by refining the prior art filter. Information for reducing the error is derived from the boundaries of the block, and the filter size is enlarged to 2×n+1 pixels, with n=2, 3, 4 preferably limited to one half the number of pixels on one side making up the block. Besides the signal and noise activity of a block, the filter determines both the pixels inside the block and the pixels outside the block. The determination is made by means of the one-dimensional filter in the horizontal and vertical directions.

4 Claims, 2 Drawing Sheets

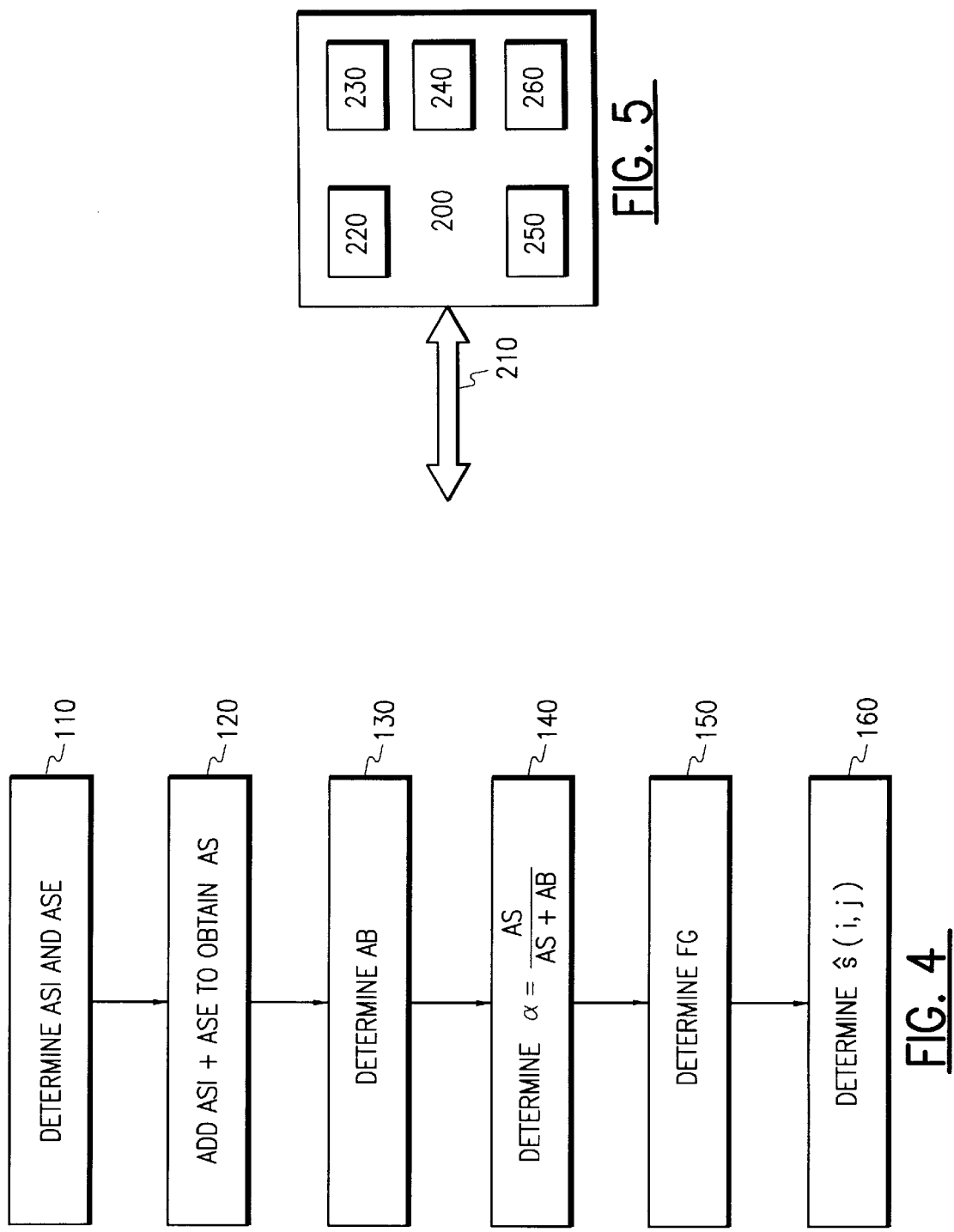

METHOD AND FILTER FOR REDUCING THE BLOCKING EFFECT IN IMAGE TRANSMISSION AND STORAGE

BACKGROUND OF THE INVENTION

1. Technical Field

The present invention relates to a method and a filter for reducing, in compression/decompression techniques for the transmission or storage of images, the so-called blocking effect, i.e. the degradation of image information produced by dividing an image into blocks of pixels.

2. Discussion of Related Art

The so-called blocking effect arises and becomes visible if images are transmitted at low bit rates, i.e., bit rates less than 2 Mbits/sec. These bit rates typically occur during transmission over ISDN using $S_0$ interfaces. In most applications, image-data compression/decompression is carried out in accordance with ITU-T Standard H.261. As a result, however, a correction of errors which lead to the blocking effect can only be performed at the output of the decoder.

The blocking effect arises due to the following circumstances. According to ITU-T Recommendation H.261, an image is divided into a plurality of blocks. The block size is preferably 8×8 pixels. For each of these blocks, a two-dimensional discrete cosine transform (DCT) is performed, yielding so-called transform coefficients. These transform coefficients indicate the characteristic of a block in the frequency domain. For image data compression, only those few coefficients which have a value higher than a predefined threshold are transmitted. As a result of the division into 8×8-pixel blocks, 64 different coefficients are available per block. These coefficients are additionally quantized. For decoding, the two operations of transformation and quantization must be performed.

An information loss already results from the segmentation into the blocks of 8×8 pixels, and since the compression is also accomplished on the basis of these blocks, further information is lost. Because the resulting image is degraded by noise, as the bit rate is reduced, the blocking effect becomes more prominent.

Filters are known which are used to reduce quantization errors, and thus the blocking effect. Such a filter was described in the form of an algorithm based on a two-dimensional 3×3 Goussian filter. This filter acts on the pixels at or near the boundary of a block. This is disadvantageous in that, while images with little image information, i.e., images showing few details, are improved, images with much image information, i.e., images showing many details, show no improvement and even are degraded. (From: H. C. Reeve III, J. S. Lim, "Reduction of Blocking Effects in Image Coding", Optical Engineering, Vol. 23, No 1, Feb. 1984, pages 34–37.)

An improvement is obtained with a filter having either a 3×1-pixel or a 1×3-pixel form. Through the use of such a filter, particularly the block corners are smoothed. The use of such a filter results in an improvement, but details remain blurred in those coded regions which are perpendicular to block boundaries, particularly if these regions show good coding. (From: K. -H. Tzou, "Post-Filtering of Transform-Coded Images", SPIE, Vol. 974, Applications of Digital Image Processing XI, 1988, pages 121–126.)

A similar filter was proposed as a one-dimensional asymmetric filter. An improvement is only obtained if the blocking effect is weak. (From: C. Avril, T. Nguyen-Trong, "Linear Filtering for Reducing Blocking Effects in Orthogonal Transform Image Coding", Journal of Electronic Imaging, Vol. 1(2), April 1992, pages 183–192.)

A further, quite different form of filters are space variant filters. This form of filters uses both the signal information and the noise information to improve the filtering. It also incorporates the masking effect to achieve the improvement. This effect means that strong filtering is performed in low-contrast regions of an image, and weak filtering in high-contrast regions. This is based on the fact that in such high-contrast regions the human eye is less sensitive to noise. The filter used is a one-dimensional low-pass filter, for example. (P. Chan, J. S. Lim, "One-Dimensional Processing for Adaptive Image Restoration", IEEE International Conference on Acoustics, Speech and Signal Processing, San Diego, Calif., March 19–21, 1984, pages 37.3.1–37.3.4.) Such a filter has the disadvantage that in the presence of severe noise the filtering is not efficient enough because the filter cannot sufficiently distinguish between noise and signal in the edge areas. As a result, almost no filtering is performed along the edges. Thus, the drawback of this method manifests itself particularly at the edges if the blocking effect occurs there, and cannot be eliminated.

SUMMARY OF INVENTION

It is an object of the invention to provide a method and a filter which solve the problems encountered in the prior art and thus result in an improved reduction of the blocking effect.

According to a first aspect of the invention, a method for reducing the blocking effect in compression/decompression techniques for the transmission or storage of images divided into a plurality of blocks wherein a signal activity (ASI) between pixels inside the block and a signal activity (ASE) between pixels outside the block are determined, and wherein said signal activities are added to obtain a measure (AS) of a local signal activity for determining a weighting coefficient ($\alpha$) in order to obtain an estimate ($\hat{s}$) for reducing the blocking effect.

According to a second aspect of the invention, a filter for reducing the blocking effect in compression/decompression techniques for the transmission and storage of images divided into a plurality of blocks, comprises means for determining a signal activity (ASI) between pixels within the block and means for determining a signal activity (ASE) between pixels outside the block, means for adding said signal activities to obtain a measure (AS) of a local signal activity, means for determining a weighting coefficient ($\alpha$), and means for calculating an estimate ($\hat{s}$) for reducing the blocking effect.

According to a third aspect of the invention, a filter according to the second aspect of the invention is used for reducing the blocking effect in H.261, H.263, MPEG1-, MPEG2-, MPEG4- or JPEG-coded images.

The invention has the advantage that the blocking effect is nearly completely eliminated without impairing the picture quality, so that no noise will be visible in the image.

A particular advantage is that if a filter size of 9 pixels is chosen, no blocking effect will be visible.

These and other objects, features and advantages of the present invention will become more apparent in light of the detailed description of a best mode embodiment thereof, as illustrated in the accompanying drawing.

BRIEF DESCRIPTION OF THE DRAWING

The invention will become more apparent from the following description of embodiments when taken in conjunction with the accompanying drawings, in which:

FIG. 4 is a flowchart showing the steps of the method according to the invention.

FIG. 5 shows a filter for reducing the blocking effect in compression/decompression techniques for the transmission and storage of images divided into a plurality of blocks, according to the present invention.

DETAILED DESCRIPTION OF PREFERRED EMBODIMENTS

Figure 1:
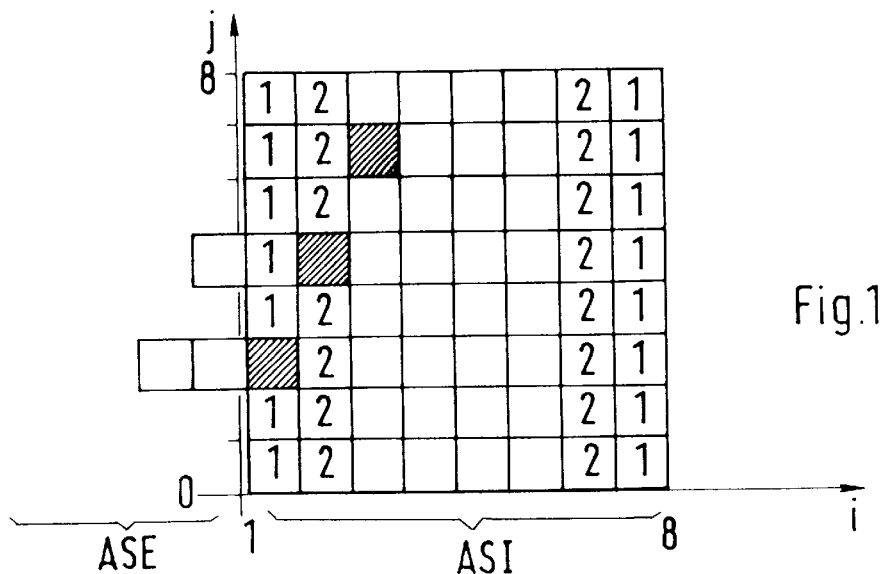
FIG. 1 shows a filter with a size of 5 pixels, according to the invention.

First, the principle of the filter and the method for reducing the blocking effect will be explained (without the aid of a drawing). In a method for reducing the blocking effect in compression/decompression techniques for the transmission or storage of images, an image is divided into a plurality of blocks. To reduce the blocking effect, use is made of a filter whose size FG is determined from $$FG = 2 \times n + 1, \text{ with } n = 2, 3, 4 \ldots \quad (1)$$

A filter size which is particularly effective for reducing the blocking effect is determined from $$FG = 2 \times n + 1, \text{ with } n = 2, 3, \ldots, \frac{N}{2}, \quad (2)$$

where the image is divided into N×N-pixel blocks and N is some even number of pixels, the evenness of N implied by the obvious requirement that the filter size be a whole number of pixels.

In the example assumed here, the filter size FG is 5. The basis for reducing the blocking effect is to determine an estimate s (i,j) with the so-called linear least square error (LLSE) of the original image:

$$s(i,j) = y(i,j) \times \alpha(i,j) + \overline{y}(i,j) \times (1-\alpha(i,j)) \quad (3)$$

where y (i,j) is the image value of the pixel at the coordinates i and j of the decoded noisy image, and $\overline{y}(i,j)$ is the local mean of the image, which is calculated by $$\overline{y}(i, j) = \frac{1}{2n+1} \sum_{k=i-n}^{k=i+n} y(k, j) \quad (4)$$

For FG = 5, therefore, $$\overline{y}(i, j) = \frac{1}{5} \sum_{k=i-2}^{k=i+2} y(k, j) \quad (5)$$

$\alpha(i,j)$ is a weighting coefficient which is dependent on both a signal activity and a noise activity. The activities are determined using criteria such as the mean square error, the cumulative absolute value error or further known schemes. If $\alpha$ is approximately 1, no filtering will be performed. $\alpha$ is approximately 1 for high signal activity and low noise activity. For low signal activity and high noise activity, $\alpha$ is approximately 0, i.e., the estimate is replaced by the mean calculated by (4) and (5). The estimate s (i,j) is calculated for each pixel to obtain local information on the respective pixel. The weighting factor $\alpha(i,j)$ is obtained from $$\alpha(i, j) = \frac{AS}{AS + AB} \quad (6)$$

where AS is a measure of the local signal activity at pixel (i,j) of the original image, as determined according to equations 7–21 below, or their obvious extension to filters of larger sizes, and AB is the noise activity.

The local signal activity is given by $$AS = \frac{1}{2}(AS_{in} + AS_{out}) \quad (7)$$

For n=2, $$AS_{in} = \sum_{k=i-2}^{k=i+2} (y(k, j) - \overline{y}(i, j)_{in})^2 \text{ and } AS_{out} = 0 \quad (8)$$

$$\overline{y}(i, j)_{in} = \frac{1}{5} \sum_{k=i-2}^{k=i+2} y(k, j) \quad (9)$$

if all filter elements are within the block. If one of the filter elements is outside the block, and the filter is located at the left-hand boundary of the block, the following equations hold:

$$AS_{in} = \sum_{k=i-1}^{k=i+2} (y(k, j) - \overline{y}(i, j)_{in})^2 \text{ and } AS_{out} = 0 \quad (10)$$

$$\overline{y}(i, j)_{in} = \frac{1}{4} \sum_{k=i-1}^{k=i+2} y(k, j) \quad (11)$$

If four filter elements are within the block, and the filter is located at the right-hand block boundary, then $$AS_{in} = \sum_{k=i-2}^{k=i+1} (y(k, j) - \overline{y}(i, j)_{in})^2 \text{ and } AS_{out} = 0 \quad (12)$$

$$\overline{y}(i, j)_{in} = \frac{1}{4} \sum_{k=i-2}^{k=i+1} y(k, j) \quad (13)$$

If three elements are within the block and two outside the block, and the filter is located at the left-hand boundary, then $$AS_{in} = \sum_{k=i}^{k=i+2} (y(k, j) - \overline{y}(i, j)_{in})^2 \quad (14)$$

$$AS_{out} = \sum_{k=i-2}^{k=i-1} (y(k, j) - \overline{y}(i, j)_{out})^2 \quad (15)$$

$$\overline{y}(i, j)_{in} = \frac{1}{3} \sum_{k=i}^{k=i+2} y(k, j) \quad (16)$$

$$\overline{y}(i, j)_{out} = \frac{1}{2} \sum_{k=i-2}^{k=i-1} y(k, j) \quad (17)$$

If the filter is located at the right-hand boundary, and three elements are within the block and two elements outside the block, then $$AS_{in} = \sum_{k=i-2}^{k=i} (y(k, j) - \bar{y}(i, j)_{in})^2 \quad (18)$$

$$AS_{out} = \sum_{k=i+1}^{k=i+2} (y(k, j) - \bar{y}(i, j)_{out})^2 \quad (19)$$

$$\bar{y}(i, j)_{in} = \frac{1}{3} \sum_{k=i-2}^{k=i} y(k, j) \quad (20)$$

$$\bar{y}(i, j)_{out} = \frac{1}{2} \sum_{k=i+1}^{k=i+2} y(k, j) \quad (21)$$

In the following, the use of the above equations will be explained in more detail with reference to FIG. 1. FIG. 1 shows a block containing 8×8 pixels. Also shown are coordinates i and j. In this example, filtering in the horizontal direction is shown. Vertical filtering is performed in analogous fashion and is not shown here for the sake of clarity. A filter has a size of FG=5. The filter consists of the pixels extending horizontally for the predetermined size and centered on a particular, central pixel. Filtering takes place in those areas which are covered by the filter. For the value j=7, a filter of size FG=5 centered on the darkened pixel would extend horizontally two pixels to the right and two pixels to the left of the darkened pixel and so lie completely inside the block. For the value j=5 a filter is shown at the left-hand boundary of the block which has four elements inside the block and one element outside the block. For the value j=3, three elements of the filter are inside the block and two are outside. In the method for reducing the blocking effect, the signal activity ASI of the central pixel of a filter of filter size FG relative to all pixels of the filter inside the block is determined based on the filter size FG. This is represented in the above equations by the values $AS_{in}$ and $y(i,j)_{in}$. This means that the signal activity of all the filter elements located inside the block is determined. In addition, a signal activity ASE of the central pixel of a filter relative to all pixels of the filter outside the block is determined. This is represented in the above equations by the values $AS_{out}$ and $y(i,j)_{out}$. This is also done by determining the signal activity located inside the covered filter region FG. By adding the signal activity ASI inside the block and the signal activity ASE outside the block, a measure AS of a local signal activity is formed. Through the determination beyond block boundaries, the influence of the blocking effect, i. e. of the noise activity along the boundaries on the value of the local signal activity, is reduced. Also, a noise activity AB of the block is determined. As explained above, a weighting coefficient α is obtained from $$\alpha = \frac{AS}{AS + AB} \quad (22)$$

By means of this weighting coefficient α, an estimate s (i,j) is determined in the horizontal direction from $$s(i,j) = y(i,j) \times \alpha(i,j) + y(i,j) \times (1 - \alpha(i,j)) \quad (23)$$

where y (i,j) is the image value of the pixel at the coordinates i,j, and y (i,j) is the image mean value associated with pixel (i,j) and calculated according to Equation 4 as adapted to filters of various sizes and positions as explained in the specification following equation 4.

In FIG. 1, there are elements inside the block which are marked by a 1. This marking is referred to the position of the middle element of the filter (dark area). The 1 designates those elements or pixels of the block where the filter is in the position in which three elements are inside the block and two elements are outside the block. That is the case both at the left-hand boundary and at the right-hand boundary. The elements designated by 2 represent those pixels of the block where four elements of the filter are inside the block and one element is outside the block. The other elements, which do not contain a designation are those pixels where the entire filter is inside the block. The filter is used in the method for reducing the blocking effect, and for the pixels specified, calculations are performed according to the above equations. It is readily apparent that for the pixels located at the left and right boundaries, two further pixels from within the block and two pixels of the adjacent block are used for the calculation.

Figure 2:
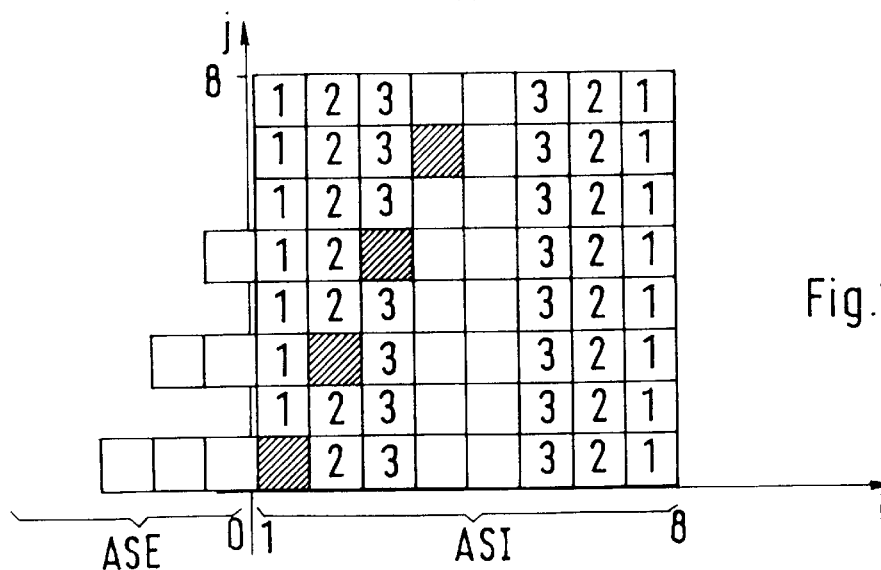
FIG. 2 shows a filter with a size of 7 pixels, according to the invention.

The use of a filter of size FG=7 will now be explained with reference to FIG. 2. The basis for the determination of the filter size FG is Equation (1), from which it follows that n=2. Analogously to the elements given in FIG. 1, a 1 designates that element inside the block where four pixels are located inside the block and three filter elements are located outside the block. A 2 marks the area where five filter elements are inside the block and two filter elements are outside. A 3 designates the element where six filter elements are inside the block and one filter element is outside. An unmarked element of the block specifies the element where the filter is completely inside the block. By extending the filter size to FG=7, the element where the entire filter is inside the block is reduced. At j=7 there is shown a filter which is completely inside the block: The filter shown at =5 has six filter elements inside the block and one outside: For j=3 there is shown a filter where five filter elements are inside the block and two outside; and for j=1 there is shown a filter where four filter elements are inside the block and three outside. The assignment to the individual values of j is only exemplary, since a filter will perform a respective calculation for each pixel in the horizontal direction. The horizontal filter is also given only by way of example, since vertical filtering is also performed, but this is not shown here for the sake of clarity.

Figure 3:
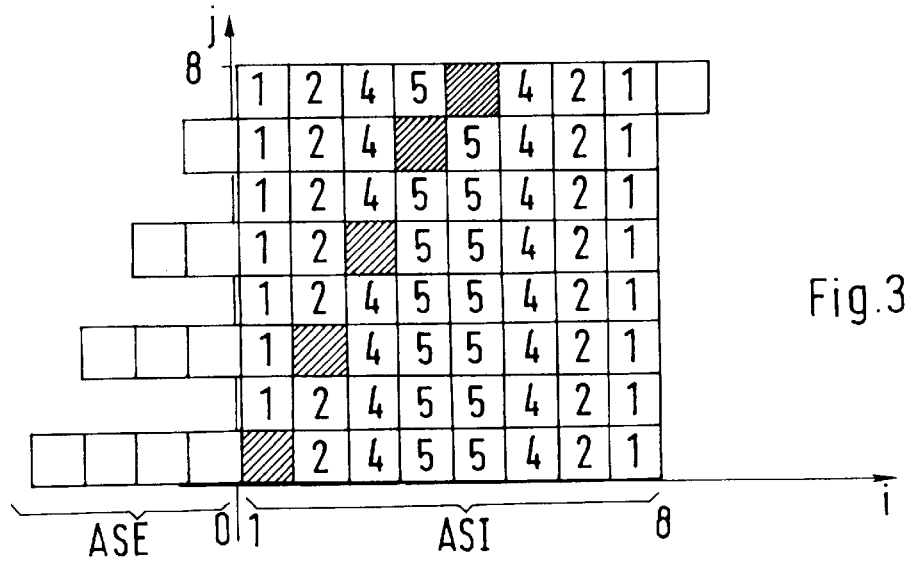
FIG. 3 shows a filter with a size of 9 pixels, according to the invention.

FIG. 3 also shows a block composed of 8×8 pixels. The filter size was chosen to be FG=9. From this it follows that n=3. With the filter size FG=9, there is no longer an element inside the block where the entire filter is inside the block. The elements 1 and 2 are still present, however. At 1, five filter elements are inside the block and four outside, and at 2, six filter elements are inside the block and three outside. 4 indicates that seven filter elements are inside the block and two outside. 5 indicates that the entire block is covered by the filter and one element is located outside. The estimate s (i,j) is calculated by the above equations.

The method according to the invention will now be explained in more detail with reference to FIG. 4. The method is to be performed for each pixel (i,j) of each block into which the image is divided. For a particular pixel (i,j), after determining a filter size FG for the pixel (i,j), in a first step 110, the signal activity ASI and the signal activity ase are determined according to equations 8–21 above or their obvious extension to filters of sizes other than FG=5. In a next step 120, the signal activities are combined according to equation 7 to obtain a measure AS of a local signal activity. In a next step 130, a noise activity AB of the block is determined. A weighting coefficient α is calculated by Equation (22), step 140. In a further step 150, the filter size FG is possibly again determined from Equation (1); if the local signal activity is zero, the filter size must be increased, i.e., instead of FG=5, a filter size of FG=7 will be chosen, for example. In a next step 160, an estimate ŝ(i,j) is calculated by Equation (3) using the local image mean ȳ(i,j) calculated according to Equation (4). The horizontal estimate thus obtained is also calculated for the vertical direction. Such a filter can be used to reduce blocking effects in H.261 -, H.263-, MPEG1 -, MPEG2-, MPEG4- or JPEG-coded images and in any other images which are segmented into blocks.

FIG. 5 shows a filtering apparatus corresponding to the one-dimensional filtering method of the present invention for reducing the blocking effect in compression/decompression techniques for the transmission or storage of images divided into a plurality of blocks. The filtering apparatus comprises a processor 200 having an input/output port 210 for receiving/transmitting video data. The processor itself comprises means 220 for determining, for a given pixel of a block, signal activity (ASI) of pixels within the block of the one-dimensional filter centered on the given pixel, means 230 for determining a signal activity (ASE) of pixels outside the block of the one-dimensional filter centered on the given pixel, means 240 for combining the signal activities to obtain a measure (AS) of a local signal activity, means 250 for determining a weighting coefficient (α), and means 260 for calculating an estimate (ŝ) for reducing the blocking effect. The weighting coefficient and estimate are calculated as described above. The estimate can be calculated for the horizontal direction and the vertical direction as well. The filter can be size, for example, 5 or 7 or 9. Such a filter can be used for reducing the blocking effect in H.261-, H.263-, MPEG 1-, MPEG2-, MPEG4- or JPEG-coded images.

For the above-described methods and the filter for reducing the blocking effect, the determination of a noise activity of the block should sometimes be performed differently, as described below. This is necessary in the following case. Assume that sharp edges of an image are located as image content at the boundaries of a block. This sharp edge, which is also sharp in the original image, would be regarded as a large error during filtering, and this error would be greatly reduced. From this it follows, however, that, if errors greater than a given value are detected, no compensation should be performed, because the original image actually contains such a sharp edge, so that a nonexistent error would be regarded as an error and reduced. For this case, a δ is formed between two pixels. If this δ is greater than 50, for example, it can be assumed that it is a real edge in an original image, i.e., that no error is present, so that no reduction of the blocking effect is necessary.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for reducing the blocking effect in compression/decompression techniques for the transmission or storage of images wherein each image is divided into a plurality of blocks, comprising a step of filtering the image at each pixel within each of the blocks, where for a given pixel in a given block the filtering is based on a one-dimensional filter of a predetermined size of filter pixels centered on the given pixel, wherein a signal activity (ASI) of the given pixel relative to the other filter pixels inside the block and a signal activity (ASE) of the given pixel relative to the filter pixels outside the block are determined, and wherein said signal activities are combined to obtain a measure (AS) of a local signal activity for determining a weighting coefficient (α) in order to obtain an estimate (ŝ) for reducing the blocking effect at the given pixel, and further wherein the filter size (FG) is determined from FG=2×n+1 with n selected from the group consisting of integers larger than 1, and further comprising the steps of:

determining the signal activity (ASI) inside the block via the filter size (FG), and determining the signal activity (ASE) outside the block via the filter size (FG);

determining the measure (AS) of the local signal activity by combining the signal activity (ASI) inside the block and the signal activity (ASE) outside the block;

determining a noise activity (AB) of the block;

calculating the weighting coefficient (α) by $$\alpha(i,j) = \frac{AS}{AS + AB};$$

and calculating an estimate ŝ(i,j), in the direction spanned by the first coordinate i of coordinates (i,j) locating pixels of the given block, by $$\hat{s}(i,j) = y(i,j) \times \alpha(i,j) + \bar{y}(i,j) \times (1-\alpha(i,j))$$

where y(i,j)=the value of the pixel at the coordinates (i,j), and

ȳ(i,j)=a mean value calculated by $$\bar{y}(i,j) = \frac{1}{FG} \sum_{k=i-n}^{k=i+n} y(k,j).$$

2. A method as claimed in claim 1 wherein if for a currently selected filter size the determination of the measure (AS) of the local signal activity yields the value zero, the filter size (FG) is determined anew from FG=2×n+1, with n=3,4, ...

with n selected so as to provide a filter size at least two pixels larger than the currently selected filter size.

3. A method as claimed in claim 1, wherein if the value of a pixel differs from the image value of a neighboring pixel by more than a predetermined threshold, no filtering of the value of that pixel is performed.

4. A filter for reducing the blocking effect in compression/decompression techniques for the transmission and storage of images wherein each image is divided into a plurality of blocks, the filtering performed for each pixel of each block using for each given pixel a one-dimensional filter of a predetermined size of filter pixels centered on the given pixel, the filter comprising means for determining a signal activity (ASI) of the given pixel relative to the other filter pixels within the block and means for determining a signal activity (ASE) of the given pixel relative to the filter pixels outside the block, means for combining said signal activities to otain a measure (AS) of a local signal activity, means for determining a weighting coefficient (α) and means for calculating an estimate (ŝ) for reducing the blocking effect, and wherein the weighting coefficient (α) is calculated by $$\alpha(i,j) = \frac{AS}{AS+AB}$$

where

AB=noise activity of the block, and wherein the estimate (ŝ) is calculated, in the direction spanned by the first coordinate i of coordinates (i,j) locating pixels of the given block, by $$\hat{s}(i,j)=y(i,j)\times\alpha(i,j)+\overline{y}(i,j)\times(1-\alpha(i,j))$$

where y(i,j)=the value of the pixel at the coordinates (i,j), and $\overline{y}$(i,j)=a mean value calculated by $$\overline{y}(i,j) = \frac{1}{FG}\sum_{k=i-n}^{k=i+n} y(k,j),$$

where

FG is the predetermined filter size and is given by $$FG=2\times n+1,$$

where n corresponds to the filter size predetermined.

* * * * *

UNITED STATES PATENT AND TRADEMARK OFFICE
CERTIFICATE OF CORRECTION

PATENT NO : 5,982,442
DATED : November 9, 1999
INVENTOR(S) : P. Guntzburger

It is certified that error appears in the above-identified patent and that said Letters Patent is hereby corrected as shown below:

At col. 9, line 12, please insert a --)-- after "y(i,j)".

At col. 10, line 1, please cancel "y(i,j)" and substitute --$\bar{y}(i,j)$-- therefor; and Signed and Sealed this Thirty-first Day of October, 2000

Attest:

*Attesting Officer*

Q. TODD DICKINSON
*Director of Patents and Trademarks*